(12) United States Patent
Fujimura et al.

(10) Patent No.: US 10,741,184 B2
(45) Date of Patent: Aug. 11, 2020

(54) ARITHMETIC OPERATION APPARATUS, ARITHMETIC OPERATION METHOD, AND COMPUTER PROGRAM PRODUCT

(71) Applicant: KABUSHIKI KAISHA TOSHIBA, Tokyo (JP)

(72) Inventors: Hiroshi Fujimura, Kanagawa (JP); Takashi Masuko, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 598 days.

(21) Appl. No.: 15/070,898

(22) Filed: Mar. 15, 2016

(65) Prior Publication Data

US 2016/0275394 A1    Sep. 22, 2016

(30) Foreign Application Priority Data

Mar. 18, 2015   (JP) .................. 2015-055010

(51) Int. Cl.
| | |
|---|---|
| *G06N 3/04* | (2006.01) |
| *G06N 3/08* | (2006.01) |
| *G10L 17/18* | (2013.01) |
| *G06N 3/02* | (2006.01) |
| *G10L 15/16* | (2006.01) |

(52) U.S. Cl.
CPC .............. *G10L 17/18* (2013.01); *G06N 3/02* (2013.01); *G10L 15/16* (2013.01)

(58) Field of Classification Search
CPC .................................. G06N 3/02; G10L 15/16
See application file for complete search history.

(56) References Cited

U.S. PATENT DOCUMENTS 5,033,006 A * 7/1991 Ishizuka ................ G06N 3/082
                                                    706/25
5,546,503 A * 8/1996 Abe ...................... G06K 9/6281
                                                    706/25

(Continued)

OTHER PUBLICATIONS

Hal Daumé III, "Frustratingly Easy Domain Adaptation", *Proceedings of the 45th Annual Meeting of the Association of Computational Linguistics*, Prague Czech Republic, pp. 256-263, Jun. 2007.

(Continued)

*Primary Examiner* — Moazzam Hossain
(74) *Attorney, Agent, or Firm* — Foley & Lardner LLP

(57) ABSTRACT

According to an embodiment, an arithmetic operation apparatus for a neural network includes an input layer calculator, a correction unit calculator, a hidden layer calculator, and an output layer calculator. The input layer calculator is configured to convert an input pattern into features as outputs of an input layer. The correction unit calculator is configured to perform calculation on N unit groups corresponding respectively to N classes of the input pattern and including correction units that each multiply a value based on inputs by a weight determined for the corresponding class. The hidden layer calculator is configured to perform calculation in a hidden layer based on the outputs of the input layer, another hidden layer, or the correction unit calculator. The output layer calculator is configured to perform calculation in an output layer based on the calculation for the hidden layer or the outputs of the correction unit calculator.

16 Claims, 7 Drawing Sheets

(56) References Cited

U.S. PATENT DOCUMENTS

| | | | | |
|---|---|---|---|---|
| 5,608,840 | A * | 3/1997 | Tsuboka | G06K 9/6226 704/236 |
| 6,496,815 | B1 * | 12/2002 | Kawashima | G06N 3/049 706/35 |
| 9,400,955 | B2 * | 7/2016 | Garimella | G06N 3/082 |
| 2011/0224565 | A1 * | 9/2011 | Ong | A61B 5/4824 600/509 |
| 2016/0253594 | A1 * | 9/2016 | Chowdhary | G06F 16/2455 706/52 |
| 2016/0267380 | A1 * | 9/2016 | Gemello | G06N 3/084 |
| 2016/0365096 | A1 * | 12/2016 | Bocklet | G10L 17/04 |

OTHER PUBLICATIONS

Kashiwagi et al., "Speaker Adaptation Using Speaker-Normalized DNN Based on Speaker Codes", *The Institute of Electronics, Information and Communication Engineers*, pp. 1-6, 2014.

Xue et al., "Direct Adaptation Hybrid DNN/HMM Model for Fast Speaker Adaptation in LVCSR Based on Speaker Code", *IEEE International Conference on Acoustic, Speech and Signal Processing (ICASSP)*, pp. 6389-6393, 2014.

\* cited by examiner

ARITHMETIC OPERATION APPARATUS, ARITHMETIC OPERATION METHOD, AND COMPUTER PROGRAM PRODUCT

CROSS-REFERENCE TO RELATED APPLICATION

This application is based upon and claims the benefit of priority from Japanese Patent Application No. 2015-055010, filed Mar. 18, 2015, the entire contents of which are incorporated herein by reference.

FIELD

Embodiments described herein relate generally to an arithmetic operation apparatus, an arithmetic operation method, and a computer program product.

BACKGROUND

Neural networks are currently used in various fields. Typical feed-forward neural networks include a plurality of layers. In an example of the typical feed-forward neural networks, each layer receives the outputs of the previous layer. In each layer, a plurality of units having different weight parameters and bias parameters each produce a weighted linear sum of the outputs of the previous layer and output the weighted linear sum to the next layer through an active function.

Although the neural network is a very strong recognizer, it is better for further improving the recognition performance to adapt the neural network to the recognition target. For example, a technique has been developed to correct the difference among the classes and perform task adaptation by adding a correction term, for each class, to the bias parameter on the linear sum in the units in each layer of the neural network. Another technique has been developed to perform the task adaptation by copying a feature vector x in the number of classes as features for the recognizer. Another technique has been developed to adapt the neural network to the classes by using a feature of (x, x, 0) for learning and evaluating a class A and using a feature of (x, 0, x) for learning and evaluating a class B, for example.

DETAILED DESCRIPTION

According to an embodiment, an arithmetic operation apparatus performs arithmetic operation on a neural network including at least an input layer, a hidden layer, and an output layer. The apparatus includes a receiver, an input layer calculator, a correction unit calculator, a hidden layer calculator, and an output layer calculator. The receiver is configured to receive an input pattern. The input layer calculator is configured to convert the input pattern into features and output the features as outputs of the input layer. The correction unit calculator is configured to perform calculation on N unit groups corresponding respectively to N classes of the input pattern and including correction units, where N is an integer equal to or larger than one. Each of the correction units receives a part or all of the outputs of the input layer or the hidden layer, multiplies a value based on inputs by a weight determined for the corresponding class, and outputs the resulting product. The hidden layer calculator is configured to receive the outputs of the input layer, another hidden layer, or the correction unit calculator, and output results of calculation performed in the hidden layer. The output layer calculator is configured to receive the calculation results in the hidden layer or the outputs of the correction unit calculator, and output a result of calculation performed in the output layer.

The following describes embodiments of an arithmetic operation apparatus in detail with reference to the accompanying drawings.

First Embodiment

An arithmetic operation apparatus according to a first embodiment performs arithmetic operation on a neural network including at least an input layer, one or more hidden layers, and an output layer. The arithmetic operation apparatus in the first embodiment is applicable to a pattern recognition apparatus that recognizes an input pattern using the neural network, for example.

Conventionally, correction to the class features is only for the bias parameters of the units in the neural network. A conventional technique that copies the features in the number of classes is applicable only to any of the predetermined classes. In contrast, the arithmetic operation apparatus according to the first embodiment can correct not only the bias parameters but also the weight parameters of the respective units in the respective layers of the neural network.

Figure 1:
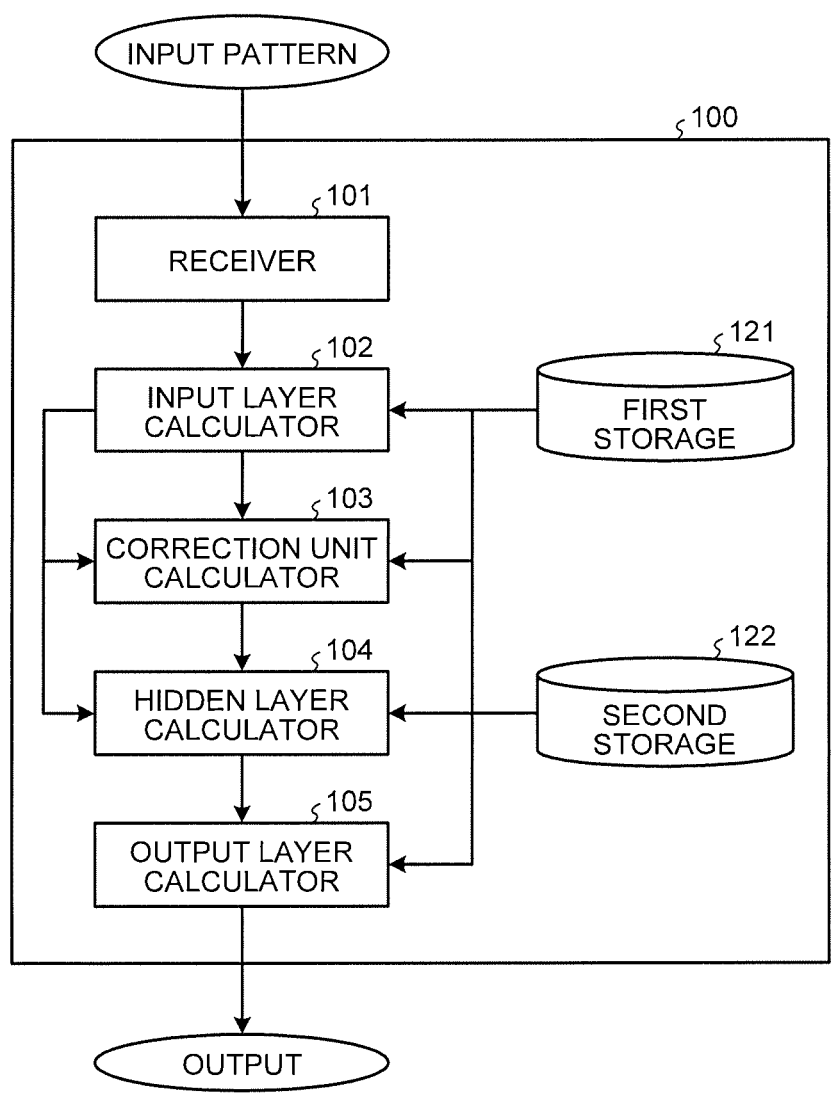
FIG. 1 is a block diagram illustrating an arithmetic operation apparatus according to a first embodiment.

FIG. 1 is a block diagram illustrating an exemplary structure of an arithmetic operation apparatus 100 in the first embodiment. As illustrated in FIG. 1, the arithmetic operation apparatus 100 includes a receiver 101, an input layer calculator 102, a correction unit calculator 103, a hidden layer calculator 104, an output layer calculator 105, a first storage 121, and a second storage 122.

The following describes a simple example in which an input voice is an input pattern and Japanese vowels (a, i, u, e, and o) are recognized using two speaker classes (a male voice and a female voice). The number of classes serving as the input pattern is not limited to two speaker classes. The number of classes may be more than two. Another class such as an environment may be used instead of the speaker class. The input pattern and the recognition targets are not limited to the voice and the vowels, respectively. For example, various signals such as images, texts, and sounds other than voices may be used for the input patterns. For another example, phonemes, phoneme states, specific persons, objects, specific keywords, topics, words, calls of animals, laughter, and coughs may be used for the recognition targets.

The arithmetic operation apparatus 100 may be applied to speaker recognition and attribute recognition using voices, for example.

The receiver 101 receives a voice (sound waveform) as the input pattern. For example, the receiver 101 receives a sound waveform input using a microphone. The receiver 101 converts the sound waveform from analog to digital, and outputs the result to the input layer calculator 102. The receiver 101 performs the conversion from the analog waveform to the digital waveform using typical analog-digital (AD) conversion. For example, the receiver 101 samples an analog sound waveform at 16 kHz and outputs a digital signal in which each sample represents an amplitude value in 16 bits.

The input layer calculator 102 performs the calculation on the input layer of the neural network. For example, the input layer calculator 102 converts the digital signal received by the receiver 101 into features, and outputs the features as the outputs of the input layer.

The input layer calculator 102 extracts the digital signal every fixed period of time. For example, the input layer calculator 102 extracts the digital waveform every 256 samples with a shift of 128 samples. The input layer calculator 102 makes the extracted 256 samples a single frame. The input layer calculator 102 calculates, from 256 samples, 12-dimensional mel-frequency cepstral coefficient (MFCC) features. The input layer calculator 102 buffers three frames of the MFCC features and outputs 36-dimensional MFCC features formed by connecting the three frames of the MFCC features as the features at a time corresponding to the central frame among the three frames.

The extracted feature is not limited to the MFCC. For example, a Mel-filter bank feature, a perceptual linear prediction (PLP), a RSTA-PLP feature, a pitch feature, and the delta components and the delta-delta components of the features may be used. The combination of the features may also be used. The number of frames connected is not limited to three. Any number of frames may be connected as long as the number of frames connected is equal to or larger than one. The extracted sample size and the frame period are not limited to the values described above.

The correction unit calculator 103 performs calculation on a correction unit layer that includes at least N unit groups each corresponding to one of N classes of the input pattern (e.g., a voice). N is an integer equal to or larger than one. Each unit group corresponding to one of the N classes includes correction units. The correction unit receives a part or all of the outputs from the input layer or the hidden layer, and outputs a result obtained by multiplying a value based on the inputs by a weight preliminarily determined for a corresponding class. The value based on the inputs is a value obtained by linear transformation (e.g., addition) of the inputs, for example.

For example, when two speaker classes and one global class are used (N=3), in the correction unit calculator 103, the respective units included in the unit groups corresponding to the respective two speaker classes and the global class copy the input features, weight the features by weights corresponding to the respective classes, and output the results to the next layer. The weights determined for the respective classes are stored in the first storage 121, for example.

The hidden layer calculator 104 receives the outputs of the previous layer, performs calculation on the units of the hidden layer relating to the hidden layer calculator 104, and outputs the calculation results. Any of the input layer calculator 102, the correction unit calculator 103, and another hidden layer calculator 104 may serve as the previous layer for the hidden layer calculator 104.

The output layer calculator 105 receives the outputs of the previous layer, performs calculation on the units of the output layer, and outputs the calculation results. Any of the correction unit calculator 103 and the hidden layer calculator 104 may serve as the previous layer for the output layer calculator 105.

The correction unit layer may be provided in any layer between the input layer and the output layer. The correction unit layer and the hidden layer are not limited to be singly provided. A plurality of correction unit layers and hidden layers may be provided.

The first storage 121 stores therein parameters (class parameters) used for calculation in the respective layers for the respective classes. The parameters include the weights determined for the respective classes. The second storage 122 stores therein parameters (neural network parameters) of a neural network model.

The receiver 101, the input layer calculator 102, the correction unit calculator 103, the hidden layer calculator 104, and the output layer calculator 105 may be implemented by executing a computer program on a processing unit such as a central processing unit (CPU), that is, implemented by software, by hardware such as an integrated circuit (IC), or by both of the software and the hardware.

The first storage 121 and the second storage 122 can be structured by generally used various storage media such as a hard disk drive (HDD), an optical disc, a memory card, and a random access memory (RAM). The first storage 121 and the second storage 122 may be structured by the physically same storage medium or physically different storage media.

Figure 2:
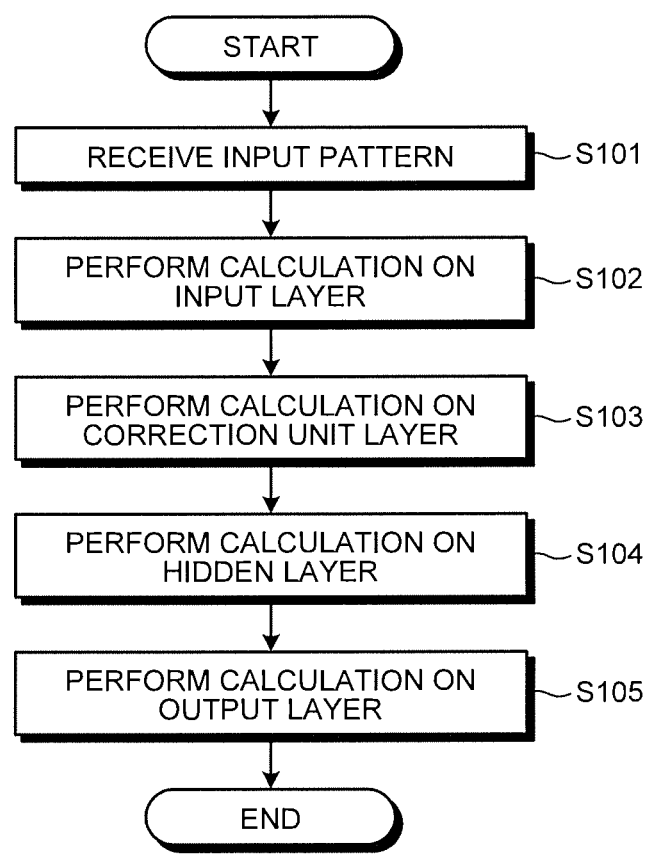
FIG. 2 is a flowchart of arithmetic operation processing in the first embodiment.

The following describes the arithmetic operation processing performed by the arithmetic operation apparatus 100 thus structured in the first embodiment with reference to FIG. 2. FIG. 2 is a flowchart illustrating exemplary arithmetic operation processing in the first embodiment.

In the following description, a feed-forward neural network is used that includes the input layer, the correction unit layer, the hidden layer, and the output layer and performs processing in this order. The embodiment is not limited to the structure of such a neural network. The neural network may be a recurrent neural network (RNN) or a long short-term memory (LSTM) neural network, which is one of the RNNs.

The receiver 101 receives a sound waveform (input pattern) (step S101). The receiver 101 AD converts the sound waveform into a digital signal, and outputs the digital signal.

The input layer calculator 102 receives the digital signal and performs calculation on the input layer (step S102). For example, the input layer calculator 102 converts the digital signal into the features.

The correction unit calculator 103 receives the outputs of the previous layer and performs calculation on the correction unit layer (step S103). For example, the correction unit calculator 103 receives the features, performs processing on the units in the unit groups corresponding to the respective classes, and outputs the processing results to the next layer.

The following describes a case where the correction unit calculator 103 receives the 36-dimensional MFCC features, which are the outputs of the input layer serving as the previous layer, and performs processing on the unit groups corresponding to the two classes and the unit group corresponding to the global class. The unit groups corresponding to the two classes are a male voice class unit group corresponding to the male voice class and a female voice class unit group corresponding to the female voice class.

The units belonging to the male voice class unit group (male voice class units) are 36 units each corresponding to one of the 36-dimensional MFCC features. Each unit receives one dimension out of the 36-dimensional MFCC features, multiplies the received MFCC feature by a weight α determined for the male voice class, and outputs the result to the next layer.

The units belonging to the female voice class unit group (female voice class units) are 36 units each corresponding to one of the 36-dimensional MFCC features in the same manner as the male voice class unit group. Each unit receives one dimension out of the 36-dimensional MFCC features, multiplies the received MFCC feature by a weight β determined for the female voice class, and outputs the result to the next layer.

The units belonging to the global class unit group (global class units) receive the 36-dimensional MFCC features and outputs the 36-dimensional features to the next layer without processing them.

In this way, the male voice class unit outputs 36-dimensional features, the female voice class unit outputs 36-dimensional features, and the global class unit outputs 36-dimensional features. The 108-dimensional features are output in total. The correction unit calculator 103 adds 1*1, 1*α, and 1*β, which represent the biases of the respective classes, to the 108-dimensional features, and outputs 111-dimensional features to the hidden layer serving as the next layer.

Figure 3:
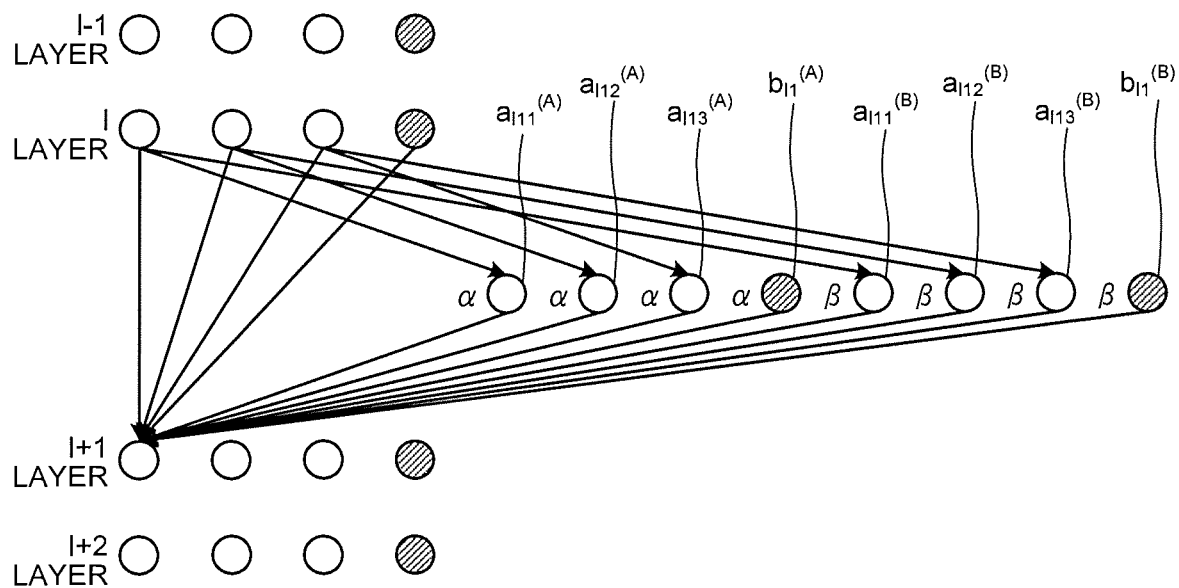
FIG. 3 is a schematic diagram illustrating an example of a neural network in the first embodiment.

FIG. 3 is a schematic diagram illustrating an exemplary structure of the neural network in the embodiment. In the example illustrated in FIG. 3, the correction unit layer is provided between the 1 layer and the (1+1) layer in the (1−1) layer to the (1+2) layer included in the neural network. In FIG. 3, circles represent the units. In the example, the number of units is four for simple explanation. In FIG. 3, the global class units are omitted to be illustrated. The arrows from the 1 layer toward the (1+1) layer indicate the function corresponding to the global class units that output their inputs to the next layer without any change.

In FIG. 3, $a_{lni}^{(A)}$ and $a_{lni}^{(B)}$ represent the weights applied to the input from the ith unit in the 1 layer to the nth unit in the (1+1) layer where i=1 to 3 and n=1 to 3; $b_{ln}^{(A)}$ and $b_{ln}^{(B)}$ represent the bias parameters output to the nth unit in the (1+1) layer; (A) and (B) each indicate corresponding information applied to the inputs copied to the unit groups corresponding to a class A and a class B; and α or β denoted on the left of the correction unit represents the weight multiplied in the calculation performed in the correction unit.

Figure 4:
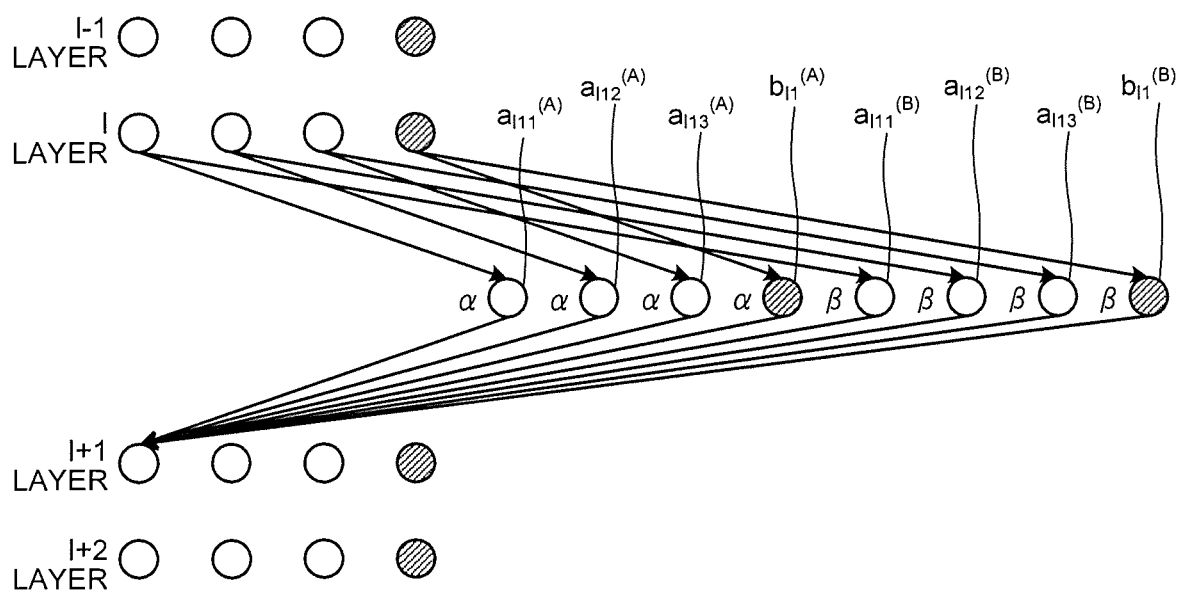
FIG. 4 is a schematic diagram illustrating another example of the neural network in the first embodiment.

Without preparing the global class units, only the specific class unit groups may be used. FIG. 4 is a schematic diagram illustrating an exemplary structure of the neural network in such a case. In the example illustrated in FIG. 4, the arrows from the 1 layer toward the (1+1) layer, that is, the function corresponding to the global class units, are eliminated.

Each unit in the class unit group in the examples illustrated in FIGS. 3 and 4 corresponds to one of the dimensions of the features of the previous layer. Each unit multiplies the corresponding dimension by the class weight and outputs the result. The structure of the unit is not limited to the example. For example, at least a part of the units may calculate the sum of a part of or all of the dimensions of the features of the previous layer, multiply the calculated sum by the weight, and output the result. In this case, the global class unit group is required.

Figure 5:
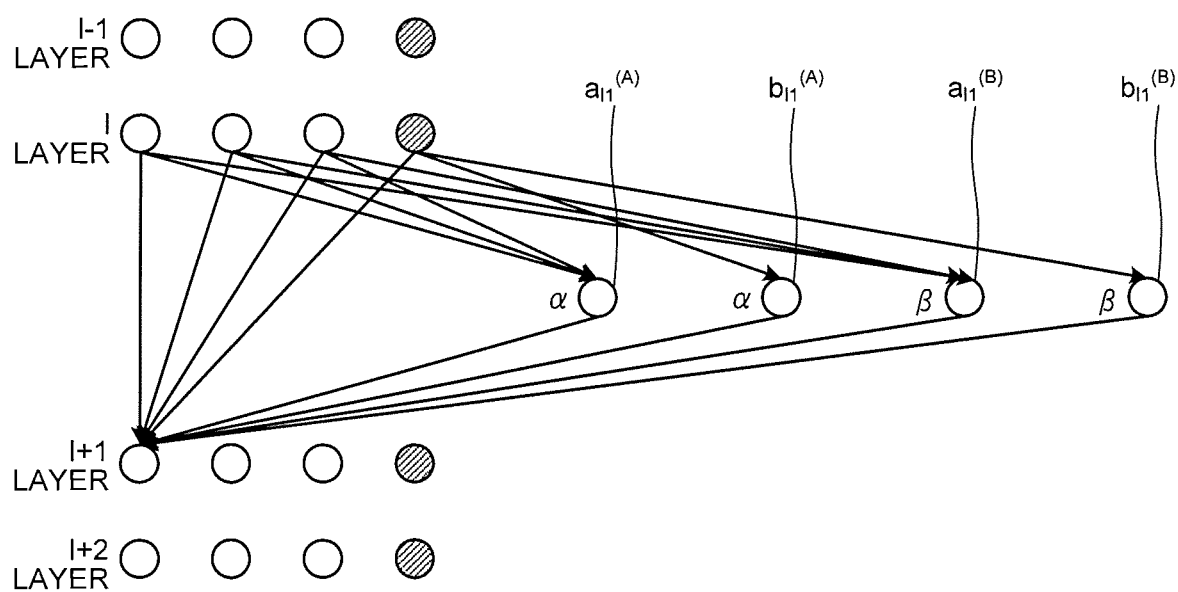
FIG. 5 is a schematic diagram illustrating still another example of the neural network in the first embodiment.

FIG. 5 is a schematic diagram illustrating an exemplary structure of the neural network in such a case. In the example illustrated in FIG. 5, the sum of all of the dimensions of the features in the 1 layer is multiplied by the weight $a_{ln}^{(A)}$ or $a_{ln}^{(B)}$ and the weight (α or β) of each class.

The correction unit layer may be provided behind the hidden layer. In this case, the outputs of the units in the hidden layer are used as the inputs of the correction unit layer. When the neural network has a recurrent structure such as the RNN, the outputs of the units in the previous frame can be used as the inputs.

The correction unit may perform nonlinear transformation instead of performing the linear transformation (e.g., addition) on a part or all of the features of the previous layer. The weights α and β, which are examples of the class parameters, are stored in the first storage 121. The weights, which are the neural network parameters, are stored in the second storage 122. The respective parameters may be obtained by prior learning, for example.

Referring back to FIG. 2, the hidden layer calculator 104 receives the processing results of the previous layer, and performs calculation on the hidden layer units using the class parameters stored in the first storage 121 (step S104).

The following describes a case where the hidden layer includes 1024 units. In the example described above, the hidden layer calculator 104 receives the 111-dimensional features from the correction unit calculator 103 serving as the previous layer. Each unit of the hidden layer performs calculation in such a manner that the linear sum of the features of the previous layer is input to an active function such as a sigmoid function. The following Equation (1) is an example of the sigmoid function. The active function is not limited to the sigmoid function. Another function such as a rectified linear unit (ReLU) may be used.

$$f(x) = \frac{1}{1+\exp(-x)} \quad (1)$$

Let the weight for the input to the nth unit in the hidden layer from the ith unit in the global class unit be $a_{ni}^{(g)}$ and the bias parameter be $b_n^{(g)}$ where i is an integer equal to or larger than 1 and equal to or smaller than 36, and n is an integer equal to or larger than 1 and equal to or smaller than 1024. Let the weight for the input to the nth unit in the hidden layer from the jth unit in the male voice class unit be $a_{nj}^{(m)}$ and the bias parameter be $b_n^{(m)}$ where j is an integer equal to or larger than 1 and equal to or smaller than 36. Let the weight for the input to the nth unit in the hidden layer from the kth unit in the female voice class unit be $a_{nk}^{(f)}$ and the bias parameter be $b_n^{(f)}$ where k is an integer equal to or larger than 1 and equal to or smaller than 36. In this case, a linear sum $l_n$ calculated at the nth unit in the hidden layer is represented by the following Equation (2). Equation (2) corresponds to a case where each unit in the class unit group corresponds to one of the features of the previous layer as illustrated in FIG. 3, for example.

$$l_n = \sum_{i=1}^{36} a_{ni}^{(g)} x_i + b_n^{(g)} + \alpha \sum_{j=1}^{36} a_{nj}^{(m)} x_j + \alpha b_n^{(m)} + \beta \sum_{k=1}^{36} a_{nk}^{(f)} x_k + \beta b_n^{(f)} = \sum_{i=1}^{36} \left( (a_{ni}^{(g)} + \alpha a_{ni}^{(m)} + \beta a_{ni}^{(f)}) x_i \right) + b_n^{(g)} + \alpha b_n^{(m)} + \beta b_n^{(f)} \quad (2)$$

It can be seen from Equation (2) that $\alpha a_{ni}^{(m)}$ and $\beta a_{ni}^{(f)}$ are the correction terms of the weight $a_{ni}^{(g)}$ for the inputs from the global class units while $\alpha b_n^{(m)}$ and $\beta b_n^{(f)}$ are the correction terms of the bias parameter $b_n^{(g)}$ of the global class units. Finally, the output of the nth unit (n is an integer equal to or larger than 1 and equal to or smaller than 1024) in the hidden layer is represented by the following Equation (3).

$$f(l_n) = \frac{1}{1 + \exp(-l_n)} \qquad (3)$$

When the correction unit layer serving as the previous layer includes the global class unit group, and the unit groups of the respective classes calculate the sum of the all of the dimensions of the features, multiply the sum by the weights, and output the results (e.g., the case illustrated in FIG. 5), the linear sum $l_n$ calculated at the nth unit in the hidden layer is represented by the following Equation (4) where n=1, ..., 1024. Let the weight for the input from the male voice class unit be $a_n^{(m)}$ and the bias parameter be $b_n^{(m)}$ while the weight for the input from the female voice class unit be $a_n^{(f)}$ and the bias parameter be $b_n^{(f)}$. When the correction unit is structured to take the sum on the static term, the delta term, and the delta-delta term of the MFCC in addition to the sum of all of the dimensions of the features, for example, the correction terms can be separated for the respective static, delta, and delta-delta terms.

$$l_n = \sum_{i=1}^{36} a_{ni}^{(g)} x_i + b_n^{(g)} + \alpha a_n^{(m)} \sum_{j=1}^{36} x_j + \alpha b_n^{(m)} + \beta a_n^{(f)} \sum_{k=1}^{36} x_k + \beta b_n^{(f)} = \qquad (4)$$

$$\sum_{i=1}^{36} \left( \left( a_{ni}^{(g)} + \alpha a_n^{(m)} + \beta a_n^{(f)} \right) x_i \right) + b_n^{(g)} + \alpha b_n^{(m)} + \beta b_n^{(f)}$$

The output layer calculator 105 receives the outputs of the hidden layer, performs calculation on the units in the output layer, and outputs output probabilities (step S105). In the following example, the number of units in the output layer is five, which is the same as the number of vowels serving as the recognition targets. The output layer calculates the linear sum of the outputs of the hidden layer, each output being represented as $f(l_n)$. The linear sum $m_n$ calculated at the nth unit (n is an integer equal to or larger than one and equal to or smaller than five) in the output layer is represented by the following Equation (5).

$$m_n = \sum_{i=1}^{1024} c_{ni} f(l_i) + d_n \qquad (5)$$

where $c_{ni}$ represents the weight and $d_n$ represents the bias parameter.

The output layer calculator 105 performs soft-max processing on the linear sum $m_n$ and calculates an output probability $o_n$, which is represented by the following Equation (6), for each vowel. The output layer calculator 105 may output the vowel having the highest output probability as the recognition result. The calculation performed in the output layer is not limited to the soft-max processing. The calculation may be performed using the sigmoid function or the ReLU.

$$o_n = \frac{\exp(m_n)}{\sum_{n=1}^{5} \exp(m_n)} \qquad (6)$$

The arithmetic operation apparatus according to the first embodiment can correct not only the bias parameters (e.g., $b_n^{(g)}$) but also the weights (e.g., $a_{ni}^{(g)}$) by calculation in the correction unit layer ($\alpha a_{ni}^{(m)}$ and $\beta a_{ni}^{(f)}$ in Equation (2), for example).

Second Embodiment

An arithmetic operation apparatus according to a second embodiment includes a function to update (learn) the respective parameters using an input pattern and a label corresponding to the input pattern (input pattern label). This structure can correct a class other than the classes used in the correction unit layer (in the first embodiment, male voices and female voices) using the weights for the classes used in the correction unit layer. The arithmetic operation apparatus in the second embodiment includes a function to integrate the correction unit layer and the next layer after updating the parameters. This function makes it possible to perform a task adaptation without an increase in calculation amount in pattern recognition processing using the neural network.

Figure 6:
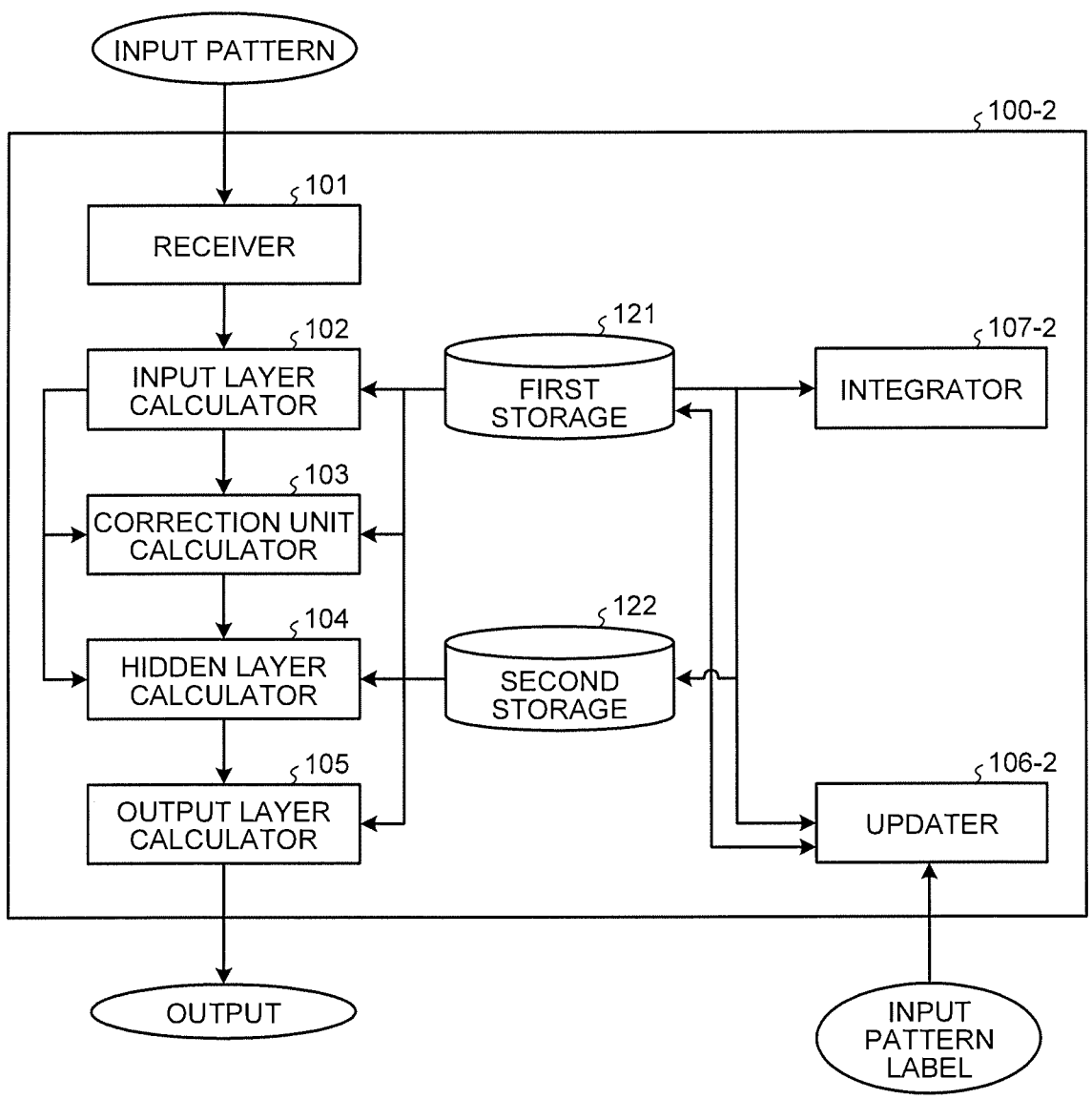
FIG. 6 is a block diagram illustrating an arithmetic operation apparatus according to a second embodiment.

FIG. 6 is a block diagram illustrating an exemplary structure of an arithmetic operation apparatus 100-2 in the second embodiment. As illustrated in FIG. 6, the arithmetic operation apparatus 100-2 includes the receiver 101, the input layer calculator 102, the correction unit calculator 103, the hidden layer calculator 104, the output layer calculator 105, the first storage 121, the second storage 122, an updater 106-2, and an integrator 107-2.

The second embodiment differs from the first embodiment in that the updater 106-2 and the integrator 107-2 are further included in the second embodiment. The other structures and functions are the same as those in the arithmetic operation apparatus 100 in the first embodiment illustrated in the block diagram in FIG. 1. The same components are labeled with the same numerals and the descriptions thereof are omitted.

The updater 106-2 updates the weights for the respective classes (class parameters) and the neural network parameters by learning based on the outputs of the output layer and the input pattern label. The input pattern label may be preliminarily input and stored in the first storage 121, the second storage 122, or another storage. The updater 106-2 stores the updated class parameters in the first storage 121 and the updated neural network parameters in the second storage 122.

The integrator 107-2 integrates the correction unit layer into the hidden layer or the output layer, which is the next layer, using the class parameters stored in the first storage 121 and the neural network parameters. The integrator 107-2 stores the neural network parameters of the neural network after the integration in the second storage 122.

Figure 7:
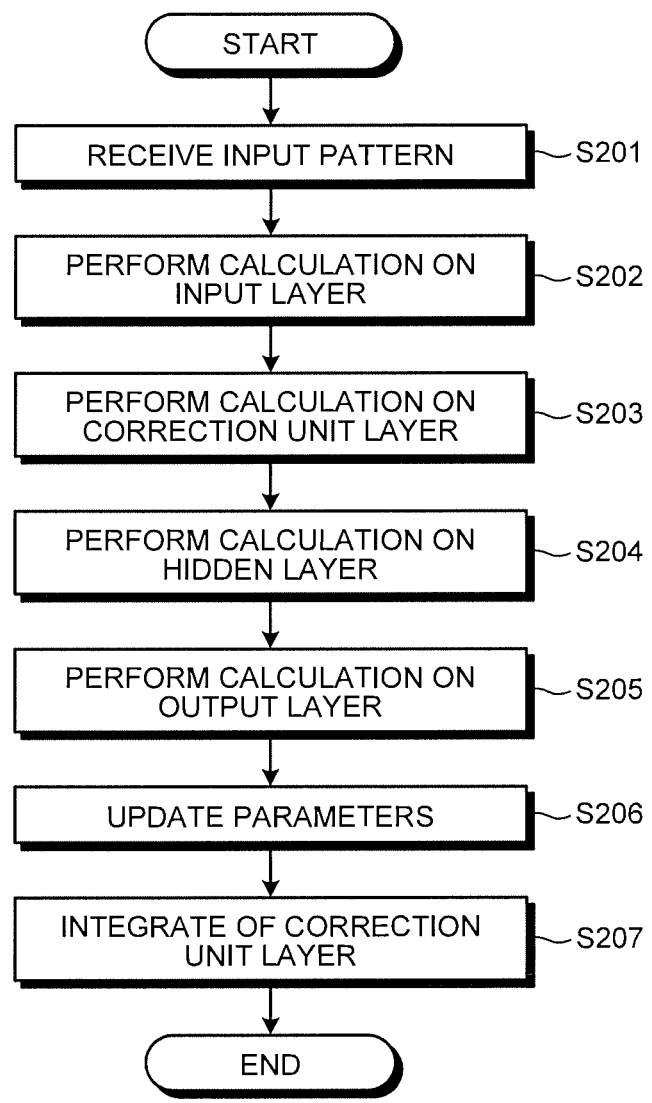
FIG. 7 is a flowchart of the arithmetic operation processing in the second embodiment.

The following describes the arithmetic operation processing performed by the arithmetic operation apparatus 100-2 thus structured in the second embodiment with reference to FIG. 7. FIG. 7 is a flowchart illustrating exemplary arithmetic operation processing in the second embodiment.

Processing from step S201 to step S205 is the same as that from step S101 to step S105 of the arithmetic operation apparatus 100 in the first embodiment, and thus the description thereof is omitted.

The updater 106-2 updates the class parameters and the neural network parameters using the input pattern label and the output results (output probabilities) of the output layer (step S206).

The following describes a case where the input pattern label is "i" and the output probability vector $o=(o_1, o_2, o_3, o_4, o_5)$ that includes the output probability $o_n$ of each vowel is (0.1, 0.7, 0.1, 0.1, 0.1). The output probabilities $o_1, o_2, o_3, o_4$, and $o_5$ represent the output probabilities of a, i, u, e, and o, which are the vowels, respectively.

The updater 106-2 executes a learning algorithm such as back propagation so as to minimize the error of the output probability vector with respect to a correct answer vector r, which is (0.0, 1.0, 0.0, 0.0, 0.0). The updater 106-2 updates the class parameters $\alpha$ and $\beta$, and the weights for the respective units in the respective layers (combined load weights), which are the neural network parameters. A cross entropy loss function can be used to train the parameters. The updater 106-2 stores the updated class parameters $\alpha$ and $\beta$ in the first storage 121. The updater 106-2 stores the updated weights for the respective units and the updated bias parameters in the second storage 122.

The applicable algorithm is not limited to the back propagation. The error reference other than the cross entropy error may be used.

The integrator 107-2 integrates the correction unit layer into the hidden layer or the output layer, which serves as the next layer (step S207). When the next layer of the correction unit layer is the hidden layer, the integrator 107-2 integrates the correction layer into the hidden layer serving as the next layer by multiplying the linear sum in each unit in the hidden layer by the linear transformation of the correction unit. A linear sum $l_n'$ at the nth unit in the integrated hidden layer is represented by the following Equation (7).

$$l_n' = \sum_{i=1}^{36} (A_i x_i) + B \quad (7)$$

$$\because A_i = a_{ni}^{(g)} + \alpha a_{ni}^{(m)} + \beta a_{ni}^{(f)}, B = b_n^{(g)} + \alpha b_n^{(m)} + \beta b_n^{(f)}$$

The arithmetic operation apparatus in the second embodiment can correct a class other than the classes used in the correction unit layer using the weights for the classes used in the correction unit layer. The integration of the correction unit layer into the next layer makes it possible to perform a task adaptation without an increase in calculation amount.

As described above, the first and the second embodiments can correct not only the bias parameters but also the weights.

Figure 8:
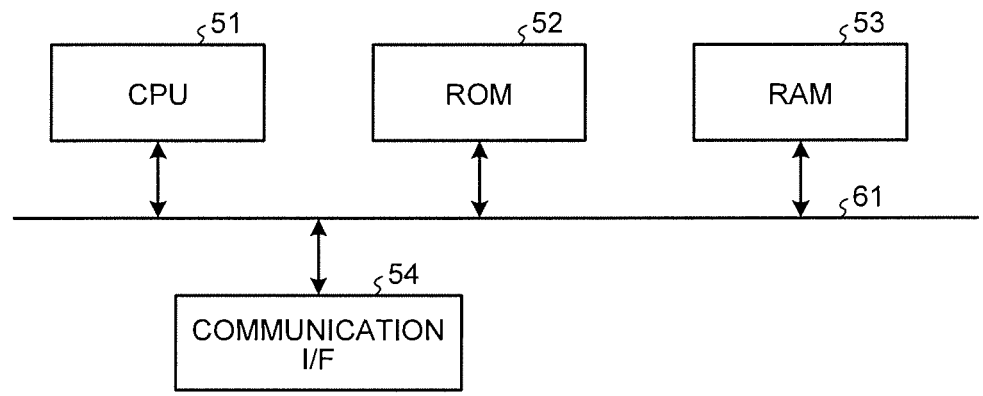
FIG. 8 is a hardware structure diagram of the arithmetic operation apparatuses in the first and the second embodiments.

The following describes a hardware structure of the arithmetic operation apparatuses in the first and the second embodiment with reference to FIG. 8. FIG. 8 is a schematic diagram illustrating the hardware structure of the arithmetic operation apparatuses in the first and the second embodiment.

The arithmetic operation apparatuses in the first and the second embodiment each include a controller such as a central processing unit (CPU) 51, storage devices such as a read only memory (ROM) 52 and a random access memory (RAM) 53, a communication interface (I/F) 54 that communicates by being connected to a network, and a bus 61 connecting these components.

A computer program executed by the arithmetic operation apparatuses in the first and the second embodiment is provided by being preliminarily stored in the ROM 52, for example.

The program executed by the arithmetic operation apparatuses in the first and the second embodiment may be recorded and provided as a computer program product, which is a computer-readable recording medium such as a compact disc read only memory (CD-ROM), a flexible disk (FD), a compact disc recordable (CD-R), and a digital versatile disc (DVD), as an installable or executable file.

The program executed by the arithmetic operation apparatuses in the first and the second embodiment may be stored in a computer connected to a network such as the Internet and provided by being downloaded via the network. The program executed by the arithmetic operation apparatuses in the first and the second embodiment may be provided or distributed via a network such as the Internet.

The program executed by the arithmetic operation apparatuses in the first and the second embodiment can cause the computer to function as the respective components in the arithmetic operation apparatus. The CPU 51 of the computer can read out the program from the computer readable storage medium to the main storage device and execute the program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An arithmetic operation apparatus that performs arithmetic operation on a neural network including at least an input layer, a hidden layer, and an output layer, the apparatus comprising:
    a receiver configured to receive an input pattern;
    an input layer calculator configured to convert the input pattern into features and output the features as outputs of the input layer;
    a correction unit calculator configured to perform calculation on N unit groups corresponding respectively to N classes of the input pattern and including correction units, each of the correction units receiving a part or all of the outputs of the input layer or the hidden layer, multiplying a value based on inputs by a weight determined for the corresponding class, and outputting the resulting product, N being an integer equal to or larger than one;
    a hidden layer calculator configured to receive the outputs of the input layer, or the correction unit calculator, and output results of calculation performed in the hidden layer; and
    an output layer calculator configured to receive the calculation results in the hidden layer or the outputs of the correction unit calculator, and output a result of calculation performed in the output layer, wherein
    the output layer calculator is configured to output the result of the calculation, which indicates a recognition result that corresponds to the input pattern among a plurality of recognition results; and
    the N classes of the input pattern are information differing from the plurality of recognition results.

2. The apparatus according to claim 1, further comprising an updater configured to update the weights for the respective classes by learning based on the output of the output layer and a label corresponding to the input pattern.

3. The apparatus according to claim 1, further comprising an integrator configured to integrate the correction unit into one or more units in the hidden layer or the output layer, the hidden layer receiving the outputs of the correction unit calculator.

4. The apparatus according to claim 1, wherein the correction unit multiplies a value by the weight, the value being obtained by performing linear transformation on a part or all of the outputs of the input layer or the outputs of the hidden layer, and outputs the resulting product.

5. The apparatus according to claim 1, wherein the input pattern is a voice.

6. The apparatus according to claim 5, wherein the class of the voice is a speaker class.

7. The apparatus according to claim 5, wherein the class of the voice is an environment class.

8. The apparatus according to claim 1, wherein
the neural network includes a first hidden layer and a second hidden layer;
the hidden layer calculator receives the outputs of the first hidden layer or the correction unit calculator, and outputs results of calculation performed in the second hidden layer; and
the output layer calculator receives the calculation results in the second hidden layer or the outputs of the correction unit calculator, and outputs the result of calculation performed in the output layer.

9. The apparatus according to claim 1, wherein the respective correction units of each of the N unit groups all use a same weight specific to the corresponding class of the input pattern.

10. The apparatus according to claim 9, wherein the respective correction units of each of the N unit groups each use a respective weight specific to the correction unit as well as the same weight specific to the corresponding class of the input pattern.

11. An arithmetic operation method for performing arithmetic operation on a neural network including at least an input layer, a hidden layer, and an output layer, the method comprising:
receiving an input pattern;
converting the input pattern into features;
outputting the features as outputs of the input layer;
performing calculation on N unit groups corresponding respectively to N classes of the input pattern and including correction units, each of the correction units receiving a part or all of the outputs of the input layer or the hidden layer, multiplying a value based on inputs by a weight determined for the corresponding class, and outputting the resulting product, N being an integer equal to or larger than one;
receiving the outputs of the input layer, or the resulting product at the performing of calculation;
outputting results of calculation performed in the hidden layer;
receiving the calculation results in the hidden layer or the resulting product at the performing of calculation; and
outputting a result of calculation performed in the output layer, wherein
the outputted result of the calculation indicates a recognition result that corresponds to the input pattern among a plurality of recognition results; and
the N classes of the input pattern are information differing from the plurality of recognition results.

12. The method according to claim 11, wherein the respective correction units of each of the N unit groups all use a same weight specific to the corresponding class of the input pattern.

13. The method according to claim 12, wherein the respective correction units of each of the N unit groups each use a respective weight specific to the correction unit as well as the same weight specific to the corresponding class of the input pattern.

14. A computer program product comprising a non-transitory computer-readable medium containing a program executed by a computer that performs arithmetic operation on a neural network including at least an input layer, a hidden layer, and an output layer, the program causing the computer to execute:
receiving an input pattern;
converting the input pattern into features;
outputting the features as outputs of the input layer;
performing calculation on N unit groups corresponding respectively to N classes of the input pattern and including correction units, each of the correction units receiving a part or all of the outputs of the input layer or the hidden layer, multiplying a value based on inputs by a weight determined for the corresponding class, and outputting the resulting product, N being an integer equal to or larger than one;
receiving the outputs of the input layer, or the resulting product at the performing of calculation;
outputting results of calculation performed in the hidden layer;
receiving the calculation results in the hidden layer or the resulting product at the performing of calculation; and
outputting a result of calculation performed in the output layer, wherein
the outputted result of the calculation indicates a recognition result that corresponds to the input pattern among a plurality of recognition results; and
the N classes of the input pattern are information differing from the plurality of recognition results.

15. The computer program product according to claim 14, wherein the respective correction units of each of the N unit groups all use a same weight specific to the corresponding class of the input pattern.

16. The computer program product according to claim 15, wherein the respective correction units of each of the N unit groups each use a respective weight specific to the correction unit as well as the same weight specific to the corresponding class of the input pattern.

* * * * *